(12) United States Patent
Makino et al.

(10) Patent No.: US 7,606,120 B2
(45) Date of Patent: Oct. 20, 2009

(54) OBJECTIVE LENS, OPTICAL HEAD, OPTICAL SYSTEM, AND DESIGN METHOD FOR OBJECTIVE LENS

(75) Inventors: Yutaka Makino, Ibaraki (JP); Yasuyuki Sugi, Ibaraki (JP)

(73) Assignee: Hitachi Maxell, Ltd., Ibaraka-shi (JP)

( * ) Notice: Subject to any disclaimer, the term of this patent is extended or adjusted under 35 U.S.C. 154(b) by 521 days.

(21) Appl. No.: 11/511,302

(22) Filed: Aug. 29, 2006

(65) Prior Publication Data

US 2007/0047425 A1    Mar. 1, 2007

(30) Foreign Application Priority Data

Aug. 30, 2005   (JP)   ............... 2005-249027

(51) Int. Cl.
  *G11B 7/00*   (2006.01)
(52) U.S. Cl. ............ 369/44.23; 369/11.23; 369/112.03; 369/44.32

(58) Field of Classification Search ....................... None
See application file for complete search history.

(56) References Cited

U.S. PATENT DOCUMENTS

2003/0142414 A1   7/2003  Sugi et al.
2003/0189772 A1*  10/2003  Maruyama et al. .......... 359/823

FOREIGN PATENT DOCUMENTS

JP        B2 3518684        4/2004

* cited by examiner

*Primary Examiner*—Muhammad N. Edun
(74) *Attorney, Agent, or Firm*—Oliff & Berridge, PLC

(57) ABSTRACT

An objective lens of this embodiment is used in an optical head in which a distance between a DVD laser and a CD laser is fixed. The objective lens focuses a laser beam emitted from the DVD laser on a DVD by a numerical aperture of 0.60, and focuses a laser beam emitted from the CD laser on a CD by an numerical aperture of 0.47. The wavefront aberration in design for CD is set greater than the wavefront aberration in design for DVD.

9 Claims, 10 Drawing Sheets

| ZONE j | RANGE OF h | B | C | K | A4 |
|---|---|---|---|---|---|
| 1 | 0~0.464667 | 0 | 4.45390E-01 | -6.67483 | 0.030017 |
| 2 | 0.464667~0.687967 | 0.00108409 | 4.46999E-01 | -8.52884E-01 | -1.11390E-03 |
| 3 | 0.687967~0.904685 | 0.00216818 | 4.45826E-01 | -5.85171E-01 | 2.36910E-03 |
| 4 | 0.904685~1.414529 | 0.00325226 | 4.46759E-01 | -6.51167E-01 | 9.59140E-04 |
| 5 | 1.414529~1.519145 | 0.00216818 | 4.28660E-01 | -3.27869E-01 | 6.74850E-03 |
| 6 | 1.519145~1.589366 | 0.00108409 | 4.42061E-01 | -5.75461E-01 | 2.50970E-03 |
| 7 | 1.589366~1.847991 | 0.00103073 | 4.45481E-01 | -6.24870E-01 | 1.77360E-03 |
| 8 | 1.847991~2.2 | -0.00113744 | 4.45319E-01 | -6.13552E-01 | 1.64620E-03 |

| A6 | A8 | A10 | A12 | A14 | A16 |
|---|---|---|---|---|---|
| 1.026695 | -14.364412 | 106.233381 | -431.806672 | 895.812958 | -725.25403 |
| 8.21580E-03 | 9.75070E-03 | -3.03780E-02 | -4.03770E-02 | 1.80080E-01 | -1.49931E-01 |
| -5.00360E-03 | 4.59410E-03 | 3.04280E-03 | -8.16540E-03 | 6.55040E-03 | -2.40830E-03 |
| 4.83750E-04 | 2.53240E-04 | -1.24670E-04 | -1.01670E-04 | 7.59740E-05 | -1.37590E-05 |
| 3.92010E-04 | -1.18360E-03 | -4.24370E-04 | 7.93880E-05 | 1.45720E-04 | -3.75090E-05 |
| 1.75070E-04 | -2.24990E-04 | -1.73810E-05 | 6.71230E-07 | 1.64740E-05 | -3.96660E-06 |
| 1.24130E-04 | -7.34610E-05 | 2.76610E-05 | -9.44330E-06 | 1.32750E-06 | -6.17570E-08 |
| 1.15930E-04 | -7.50480E-05 | 2.80220E-05 | -9.53270E-06 | 1.33720E-06 | -6.23130E-08 |

Fig. 3

| LIGHT INCIDENT SURFACE | | | | | |
|---|---|---|---|---|---|
| ZONE j | 1 | 2 | 3 | 4 | 5 |
| RANGE OF h | 0~0.463764 | 0.463764~0.68622 | 0.68622~0.902951 | 0.902951~1.415377 | 1.415377~1.519864 |
| B | 0 | 0.001084089 | 0.002168177 | 0.003252266 | 0.002168177 |
| C | 0.449252444 | 0.450833809 | 0.44991691 | 0.450619944 | 0.446237801 |
| K | -8.235234113 | -0.835208008 | -0.614853122 | -0.666780079 | -0.578172218 |
| A4 | 0.045708404 | -0.000669106 | 0.002228744 | 0.001314034 | 0.002848044 |
| A6 | 1.235827108 | 0.005362595 | -0.003074736 | 0.000490135 | 0.000264967 |
| A8 | -19.64552898 | 0.014438256 | 0.000485525 | 0.000303777 | -0.000342355 |
| A10 | 165.8597118 | -0.021436835 | 0.005595016 | -9.6389E-05 | -8.25935E-06 |
| A12 | -786.797374 | -0.060147572 | 0.000638971 | -0.000138024 | -1.26509E-06 |
| A14 | 1968.99151 | 0.149653762 | -0.009980333 | 9.05051E-05 | 3.25817E-05 |
| A16 | -2023.57448 | -0.089207577 | 0.005691616 | -1.57532E-05 | -8.39262E-06 |

| LIGHT INCIDENT SURFACE | | | | |
|---|---|---|---|---|
| ZONE j | 6 | 7 | 8 | 9 |
| RANGE OF h | 1.519864~1.59012 | 1.59012~1.8816 | 1.8816~1.9824 | 1.9824~2.2 |
| B | 0.001084089 | -0.001137444 | -0.003305622 | -0.002221533 |
| C | 0.451063019 | 0.449175309 | 0.499010532 | 0.449092905 |
| K | -0.653068598 | -0.633204507 | -0.632964215 | -0.633002872 |
| A4 | 0.001788429 | 0.001998669 | 0.001994298 | 0.00199556 |
| A6 | 0.000108689 | 0.000216378 | 0.000215229 | 0.000215734 |
| A8 | -0.000153769 | -9.51553E-05 | -9.43006E-05 | -9.47316E-05 |
| A10 | 8.64819E-05 | 5.59694E-05 | 5.54503E-05 | 5.57089E-05 |
| A12 | -8.82082E-06 | -1.95224E-05 | -1.93451E-05 | -1.94336E-05 |
| A14 | 8.08699E-06 | 3.42547E-06 | 3.39422E-06 | 3.40981E-06 |
| A16 | -2.82061E-06 | -2.53164E-07 | -2.50872E-07 | -2.52015E-07 |

Fig. 9

OBJECTIVE LENS, OPTICAL HEAD, OPTICAL SYSTEM, AND DESIGN METHOD FOR OBJECTIVE LENS

BACKGROUND OF THE INVENTION

1. Field of the Invention

The present invention relates to an objective lens, an optical head, an optical system, and a method of designing an objective lens which can be used for an optical disk apparatus capable of recording/playback on a plurality of types of optical disks having different protective layer thickness and recording density.

2. Description of Related Art

There are a plurality of standards for optical disks, with a difference in thickness of a protective layer, i.e. a transparent substrate to cover a recording surface, and in recording density. For example, the thickness of a protective layer of CD (Compact Disk) and CD-R (CD Recordable) having relatively low recording density is 1.2 mm, and the thickness of a protective layer of DVD (Digital Versatile Disk) having relatively high recording density is 0.60 mm, which is half the thickness of CD and CD-R.

The recording and playback of DVD with high recording density require the use of laser light having a short wavelength of about 635 to 660 nm to obtain a small beam spot diameter. On the other hand, the recording and playback of CD-R require the use of laser light having a long wavelength of about 780 nm because of its reflection property.

To allow the use of these different types of optical disks, an optical disk apparatus is preferably compatible with optical disks of any of these standards. In order to enable the use of both DVD and CD-R, an optical disk apparatus needs to have at least two lasers which emit laser light having a wavelength in accordance with each optical disk. Further, in order to downsize an optical disk apparatus, an optical system of an optical head needs to be as compact as possible. It is thus preferred to use a single optical device such as an objective lens for both of two wavelengths and employ a module in which two lasers are integrated into one package as a light source.

Japanese Patent No. 3518684 discloses an optical disk apparatus which enables the use of a single lens as an objective lens for any type of optical disks.

However, in the case of using a module in which two lasers are integrated into one package, light emitting points from the two lasers are arranged in a line along the direction perpendicular to the optical axis of an objective lens, which causes a certain difference to occur in angle of incidence on the objective lens between the laser light beams with two different wavelengths. Accordingly, it is impossible for the incidence angles of laser light beams with two different wavelengths to be both 0, with which wavefront aberration is minimized. It is therefore necessary for the incidence angles of laser light beams with two different types of optical disks to set with the wavefront aberration in an allowable range.

The present invention has been accomplished to overcome the above drawbacks, and an object of the present invention is to provide an objective lens, an optical head, an optical system, and a design method for an objective lens capable of focusing laser beams on an information recording surface while minimizing aberration for each of a plurality of types of optical disks with a different thickness of transparent substrates.

SUMMARY OF THE INVENTION

According to an aspect of the present invention, there is provided an objective lens for use in an optical head having a fixed distance between a first laser emitting a laser beam with a wavelength $\lambda 1$ and a second laser emitting a laser beam with a wavelength $\lambda 2$ being longer than the wavelength $\lambda 1$, the objective lens focusing the laser beam emitted from the first laser on a first optical disk by a first numerical aperture and focusing the laser beam emitted from the second laser on a second optical disk by a second numerical aperture being smaller than the first numerical aperture, wherein wavefront aberration in design for the second optical disk is greater than wavefront aberration in design for the first optical disk.

According to another aspect of the present invention, there is provided an objective lens for use in an optical head having a fixed distance between a first laser emitting a laser beam with a wavelength $\lambda 1$ and a second laser emitting a laser beam with a wavelength $\lambda 2$ being longer than the wavelength $\lambda 1$, the objective lens focusing the laser beam emitted from the first laser on a first optical disk by a first numerical aperture and focusing the laser beam emitted from the second laser on a second optical disk by a second numerical aperture being smaller than the first numerical aperture, wherein composite aberration $(C2^2+AS2^2)^{1/2}$ of coma aberration C2 and astigmatism AS2 of the second optical disk in design is greater than composite aberration $(C1^2+AS1^2)^{1/2}$ of coma aberration C1 and astigmatism AS1 of the first optical disk in design.

In the above objective lens, it is preferred to satisfy: $0.25<(C1^2+AS1^2)^{1/2}/(C2^2+AS2^2)^{1/2}<0.80$. It is further preferred to satisfy: $0.12<(C1/C2)<0.70$. Further preferably, a ratio $t1/(t1+t2)$ of a distance $t1$ from an optical axis to the first laser and a distance $(t1+t2)$ between the first laser and the second laser is smaller than 0.80.

An optical head can be produced using the objective lens having such a configuration. Further, an optical system can be produced using the optical head.

According to another aspect of the present invention, there is provided a design method for an objective lens for use in an optical head having a fixed distance between a first laser emitting a laser beam with a wavelength $\lambda 1$ and a second laser emitting a laser beam with a wavelength $\lambda 2$ being longer than the wavelength $\lambda 1$, the objective lens focusing the laser beam emitted from the first laser on a first optical disk by a first numerical aperture and focusing the laser beam emitted from the second laser on a second optical disk by a second numerical aperture being smaller than the first numerical aperture, wherein wavefront aberration in design for the second optical disk is greater than wavefront aberration in design for the first optical disk.

If coma aberration and astigmatism of the first optical disk in design are C1 and AS1, respectively, and coma aberration and astigmatism of the second optical disk in design are C2 and AS2, respectively, values of C1, AS1, C2, and AS2 are preferably determined so as to satisfy: $0.25<(C1^2+AS1^2)^{1/2}/(C2^2+AS2^2)^{1/2}<0.80$. Also preferably, a ratio $t1/(t1+t2)$ of a distance $t1$ from an optical axis to the first laser and a distance $(t1+t2)$ between the first laser and the second laser is smaller than 0.80.

According to another aspect of the present invention, there is provided an objective lens for use in an optical head having a fixed distance between a first laser emitting a laser beam with a wavelength $\lambda 1$ and a second laser emitting a laser beam with a wavelength λ2 being longer than the wavelength λ1, the objective lens focusing the laser beam emitted from the first laser on a first optical disk by a first numerical aperture and focusing the laser beam emitted from the second laser on a second optical disk by a second numerical aperture, wherein composite aberration $(C1^2+AS1^2)^{1/2}$ of coma aberration C1 and astigmatism AS1 of the first optical disk and composite aberration $(C2^2+AS2^2)^{1/2}$ of coma aberration C2 and astigmatism AS2 of the second optical disk satisfy: $0.25<(C1^2+AS1^2)^{1/2}/(C2^2+AS2^2)^{1/2}<0.80$.

The present invention can provide an objective lens, an optical head, an optical system, and a design method for an objective lens capable of focusing laser beams on an information recording surface while minimizing aberration for each of a plurality of types of optical disks with a different thickness of transparent substrates.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIG. 3 is a table showing the design results for an objective lens according to a first embodiment of the present invention;

FIG. 9 is a table showing the design results for an objective lens according to a second embodiment of the present invention;

DESCRIPTION OF THE PREFERRED EMBODIMENTS

First Embodiment

Exemplary embodiments of the present invention are described hereinafter with reference to the drawings. The following embodiments employ two types of optical disks (optical recording media) having a different thickness of transparent substrates, which are DVD and CD, by way of illustration. Although a lens according to a first embodiment of the invention is designed using a refractive index of a glass material, it is possible to use a plastic material instead.

Figure 1:
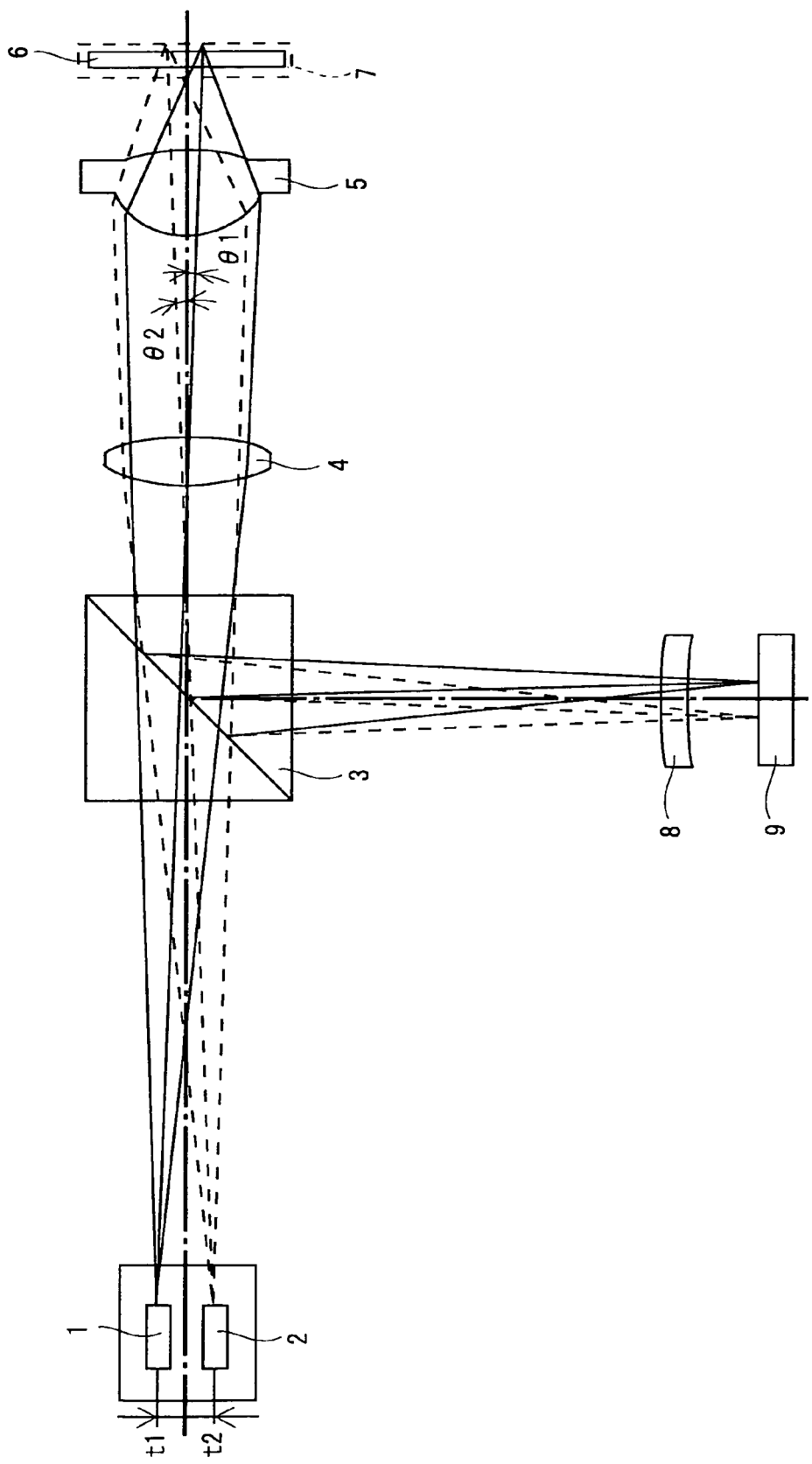
FIG. 1 is a view showing the structure of an optical head according to an embodiment of the present invention.

FIG. 1 is a view showing the structure of an optical head according to a first embodiment of the present invention. The optical head includes a DVD laser 1, a CD laser 2, a half mirror or half prism 3, a collimator lens 4, an objective lens 5, a DVD disk 6, a CD disk 7, a detection lens 8, and an optical detector 9. The DVD laser 1 and the CD laser 2 are integrated into one module.

The objective lens 5 may be an objective lens compatible with DVD and CD which is disclosed in Japanese Patent No. 3518684, for example. The objective lens 5 cancels out the wavefront aberration which occurs due to a difference in thickness of transparent substrates of optical recording media by chromatic aberration which occurs due to a difference in wavelength of optical beams.

In FIG. 1, the optical path of a laser beam emitted from the DVD laser 1 is indicated by a full line. The DVD laser 1 emits a laser beam having a wavelength of 655 nm. The laser beam emitted from the DVD laser 1 passes through the half mirror 3 and enters the collimator lens 4. After passing through the collimator lens 4, the laser beam, which is now parallel light, enters the objective lens 5 and is focused to produce an optical spot on the information recording surface of the DVD disk 6.

In FIG. 1, the optical path of a laser beam emitted from the CD laser 2 is indicated by a dotted line. The CD laser 2 emits a laser beam having a wavelength of 790 nm. The laser beam emitted from the CD laser 2 passes through the half mirror 3 and enters the collimator lens 4. After passing through the collimator lens 4, the laser beam, which is now parallel light, enters the objective lens 5 and is focused to produce an optical spot on the information recording surface of the CD disk 7.

The laser beams reflected by the DVD disk 6 and the CD disk 7 pass through the objective lens 5 and the collimator lens 4 and enter the half mirror 3. The laser beams are reflected by the half mirror 3 and focused by the detection lens 8 and finally enter the light detector 9.

As shown in FIG. 1, neither of the DVD laser 1 nor the CD laser 2 is placed on the optical axis. The DVD laser 1 and the CD laser 2 are shifted from the optical axis by a distance t1 and a distance t2, respectively.

Accordingly, the angle of incidence of each optical path on the objective lens 5 is not parallel with the optical axis. The DVD optical path and the CD optical path are inclined with respect to the optical axis by an angle θ1 and an angle θ2, respectively. Thus, the laser beams emitted from each of the DVD laser 1 and the CD laser 2 are obliquely incident on the objective lens 5.

If a focal length of the collimator lens 4 is fc, the following expression can be obtained:

$$\theta1=\tan(t1/fc)$$

$$\theta2=\tan(t2/fc)$$

In this example, an interval of light emission points of the DVD laser 1 and the CD laser 2 is 0.11 mm, and the following expression can be thus obtained:

$$t1+t2=0.11$$

In this embodiment, the focal length of the objective lens for DVD is 3.36 mm, and the magnification of the optical system is −⅕. Thus, the focal length fc of the collimator lens 4 is: 3.36*5=16.8 mm.

Wavefront aberration is smaller as an incidence angle of the laser beams emitted from the DVD laser 1 and the CD laser 2 on the objective lens 5 is smaller. If the relative position of the DVD laser 1 and the CD laser 2 is fixed as in this embodiment, if the incidence angle of one is set smaller, the incidence angle of the other becomes larger. Thus, reduction of wavefront aberration for one laser results in increase in wavefront aberration for the other laser. Therefore, an objective lens should be designed so that wavefront aberration is substantially the same for each of a plurality of optical disks.

The present invention gives consideration to aberration which occurs in manufacture in addition to aberration which occurs in design. Product aberration, design aberration and manufacturing aberration, each for DVD, are Pd, Dd, and Md, respectively. Product aberration, design aberration and manufacturing aberration, each for CD, are Pc, Dc, and Mc, respectively.

The product aberration Pd and Pc for DVD and CD, respectively, can be typically expressed as follows:

$$Pd=(Dd^2+Md^2)^{1/2} \qquad \text{Expression I:}$$

$$Pc=(Dc^2+Mc^2)^{1/2} \qquad \text{Expression II:}$$

Coma aberration and astigmatism which occur in the process of manufacturing DVD is Cd and ASd, respectively. Coma aberration and astigmatism which occur in the process of manufacturing CD is Cc and ASc, respectively. Then, the manufacturing aberration Md and Mc can be expressed as follows:

$$Md=(Cd^2+ASd^2+\alpha)^{1/2} \qquad \text{Expression III:}$$

$$Mc=(Cc^2+ASc^2+\alpha)^{1/2} \qquad \text{Expression IV:}$$

where $\alpha$ is other aberration.

If NA for DVD is NAd and NA for CD is NAc, a ratio of coma aberration of DVD and CD is a ratio of cubes of NA, and a ratio of astigmatism of DVD and CD is a ratio of squares of NA. Thus, the following expression can be obtained:

$$Cd/Cc=NAd^3/NAc^3 \qquad \text{Expression V:}$$

i.e., $Cc=Cd/(NAd^3/NAc^3)$ $$ASd/ASc=NAd^2/NAc^2 \qquad \text{Expression VI:}$$

i.e., $ASc=ASd/(NAd^2/NAc^2)$

Substitution of the expressions V and VI into the expression IV gives the following expression:

$$Mc=\{Cd^2/(NAd^3/NAc^3)^2+ASd^2/(NAd^2/NAc^2)^2+\alpha\}^{1/2} \qquad \text{Expression VII:}$$

From the expressions (3) and (7), Md/Mc can be expressed as follows:

$$Md/Mc=(Cd^2+ASd^2+\alpha)^{1/2}/\{Cd^2/(NAd^3/NAc^3)^2+ASd^2/(NAd^2/NAc^2)^2+\alpha\}^{1/2} \qquad \text{Expression VIII:}$$

The magnitude relation of Md and Mc can be given based on the expression (8). In order to substantially equalize the product aberration for both disks, because $Dd^2+Md^2=Dc^2+Mc^2$, Dd should be smaller than Dc if Md is larger than Mc, and Dd should be larger than Dc if Md is smaller than Mc.

In this embodiment, NA for DVD is 0.6, and NA for CD is 0.47. Thus, $Cd:Cc=0.6^3:0.47^3=1:0.48$, $ASd:ASc=0.6^2:0.47^2=1:0.61$. Further, from the expression VIII, Mc can be expressed as follows:

$$Mc=(Cd^2+ASd^2+\alpha)^{1/2}/\{Cd^2*0.23+ASd^2*0.37+\alpha\}^{1/2}$$

i.e., $Mc\approx0.5*Md$

This results show that the manufacturing aberration Md is about two times larger than Mc.

Then, because the manufacturing aberration Md is larger than Mc, the design aberration Dd should be smaller than Dc in order to substantially equalize the product aberration Pd and Pc. If Dd/Dc is within the following range, the product aberration Pd and Pc can be substantially the same:

$$0.25 < Dd/Dc < 0.80$$

The design aberration includes coma aberration, astigmatism, spherical aberration and high-order aberration. The aberration due to the use of a two-wavelength laser unit is coma aberration and astigmatism, and their values are larger than the other aberration.

Thus, if coma aberration in design for DVD is Cdd, coma aberration in design for CD is Ccd, astigmatism in design for DVD is ASdd, and astigmatism in design for CD is AScd, Dd and Dc can be expressed as follows:

$$Dd=(Cdd^2+ASdd^2)^{1/2}$$

$$Dc=(Ccd^2+AScd^2)^{1/2}$$

Further, from the expression V, the coma aberration in manufacture for DVD is larger than the coma aberration in manufacture for CD. Thus, the coma aberration Cdd in design for DVD and the coma aberration Ccd in design for CD preferably satisfy the following inequality expression:

$$0.12 < (Cdd/Ccd) < 0.70$$

Figure 2:
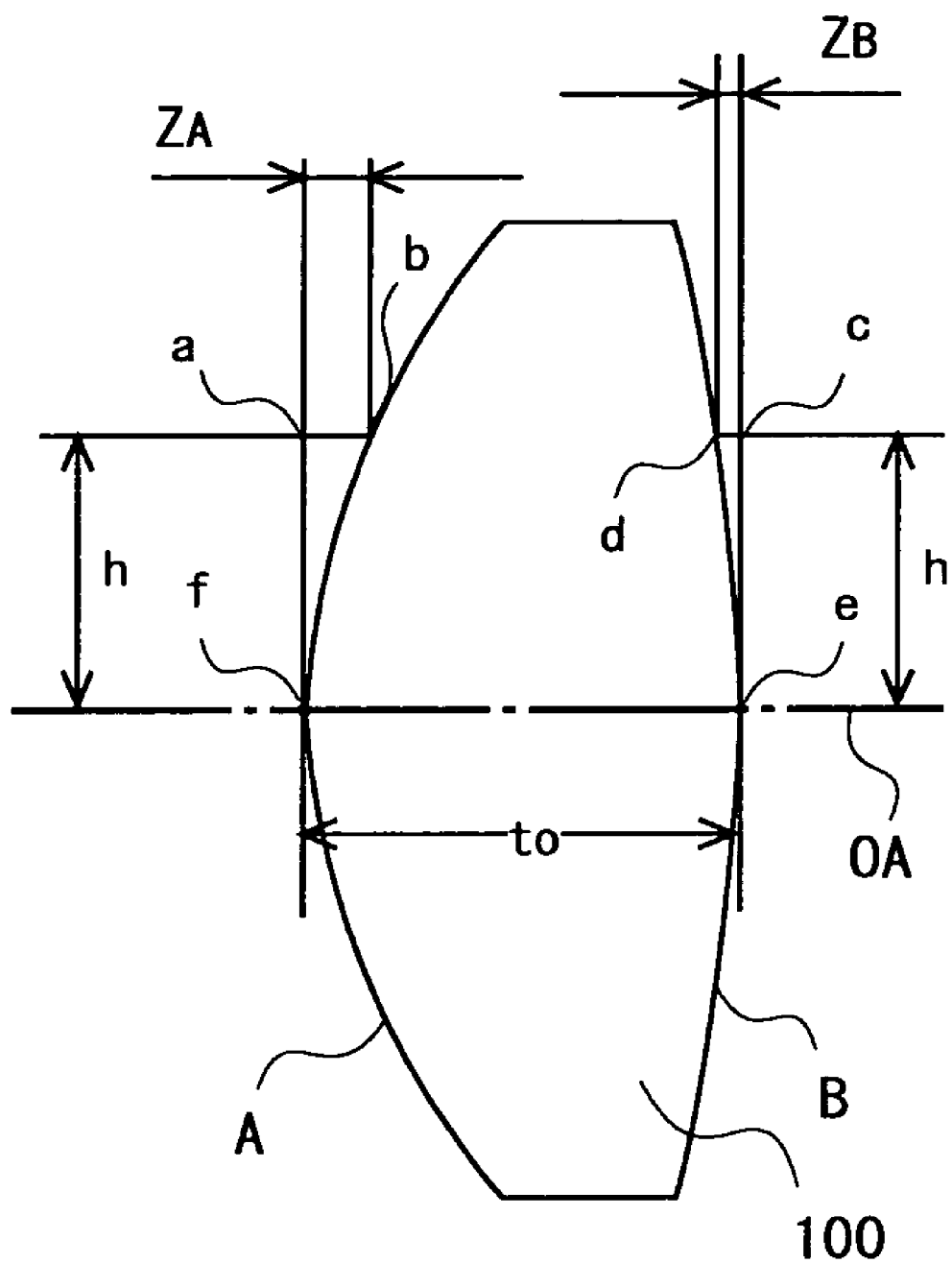
FIG. 2 is a view showing the surface shape of an objective lens according to an embodiment of the present invention.

The surface shape of a light incident surface A of the objective lens according to this embodiment is described hereinafter with reference to FIG. 2. A distance between points a and b in the j-th zone from an optical axis OA of the light incident surface A in a beam height h direction (radius direction) is expressed by the following function $Z_{Aj}$:

$$Z_{Aj} = B + \frac{Ch^2}{1+\sqrt{1(K+1)C^2 \cdot h^2}} + A_4h^4 + A_6h^6 + A_8h^8 + A_{10}h^{10} + A_{12}h^{12} + A_{14}h^{14} + A_{16}h^{16}$$

The beam height h in this function is the one measured in the j-th zone.

FIG. 3 shows the range of h and the coefficients B, C, K, $A_4$, $A_6$, $A_8$, $A_{10}$, $A_{12}$, $A_{14}$, and $A_{16}$ for enabling appropriate reduction of aberration into an acceptable range both for DVD and CD in each zone in the above function.

The surface shape $Z_B$ of a light exit surface B in the first embodiment can be expressed as follows:

$$Z_B = \frac{Ch^2}{1+\sqrt{1-(K+1)C^2 \cdot h^2}} + A_4 h^4 + A_6 h^6 + A_8 h^8 + A_{10} h^{10}$$

where $C=-0.0747792$, $K=15.7398$, $A_4=0.012308$, $A_6=-0.0037652$, $A_8=0.00068571$, $A_{10}=-0.000048284$.

A distance between surface vertexes f and e on the optical axis of the objective lens 100, which is a center thickness to, is 2.2 mm. A refractive index n at a wavelength $\lambda_1=655$ nm (DVD) is 1.604194, and a refractive index n at a wavelength $\lambda_2=790$ nm (CD) is 1.599906.

The numerical aperture NA for a wavelength of the DVD laser 1 is 0.60, and a focal length ft for the DVD disk 6 is 3.36 mm. The numerical aperture NA for a wavelength of the CD laser 2 is 0.47, and a focal length ft for the CD disk 7 is 3.38 mm.

Figure 4:
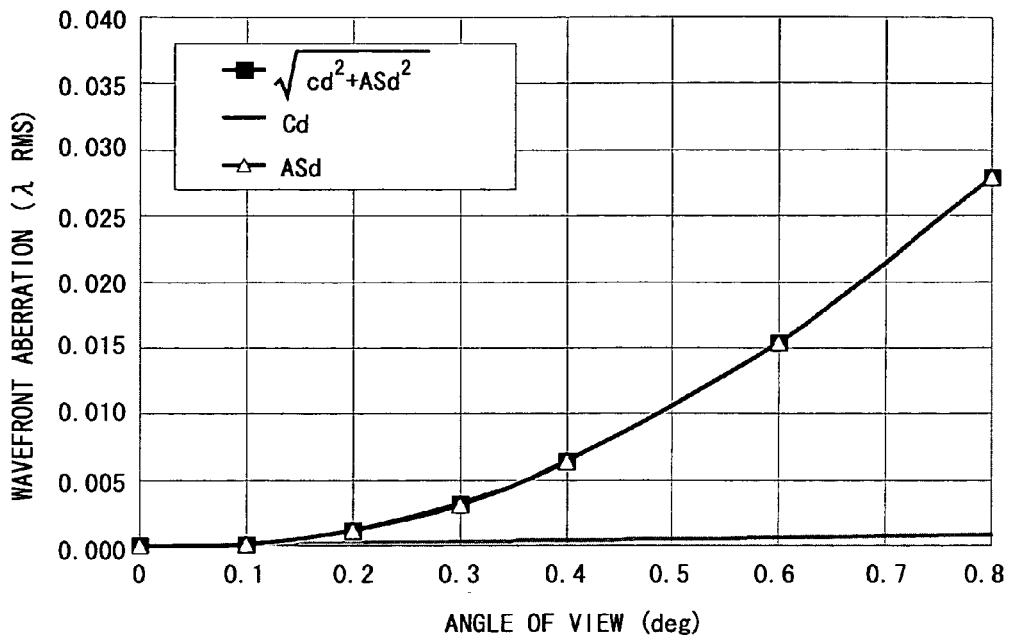
FIG. 4 is graph showing the characteristics of an angle of view for a DVD wavelength of an objective lens according to the first embodiment of the present invention.
Figure 5:
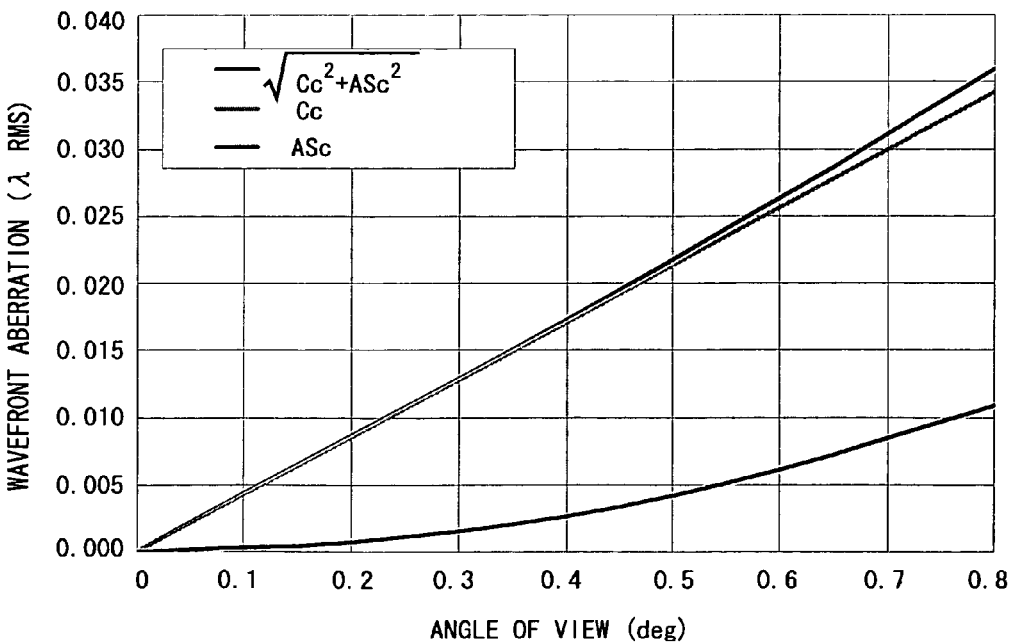
FIG. 5 is graph showing the characteristics of an angle of view for a CD wavelength of the objective lens according to the first embodiment of the present invention.

FIGS. 4 and 5 show the characteristics of an angle of view with respect to wavefront aberration for DVD and CD, respectively, in the design results shown in FIG. 3. As shown in FIGS. 4 and 5, wavefront aberration increases as the angle of view increases in both DVD and CD. This is particularly significant in astigmatism aberration. To give greater importance to the characteristics of an angle of view with respect to wavefront aberration for DVD, t1 should be small and t2 should be large. On the other hand, to give greater importance to the characteristics of an angle of view with respect to wavefront aberration for CD, t1 should be large and t2 should be small.

Figure 6:
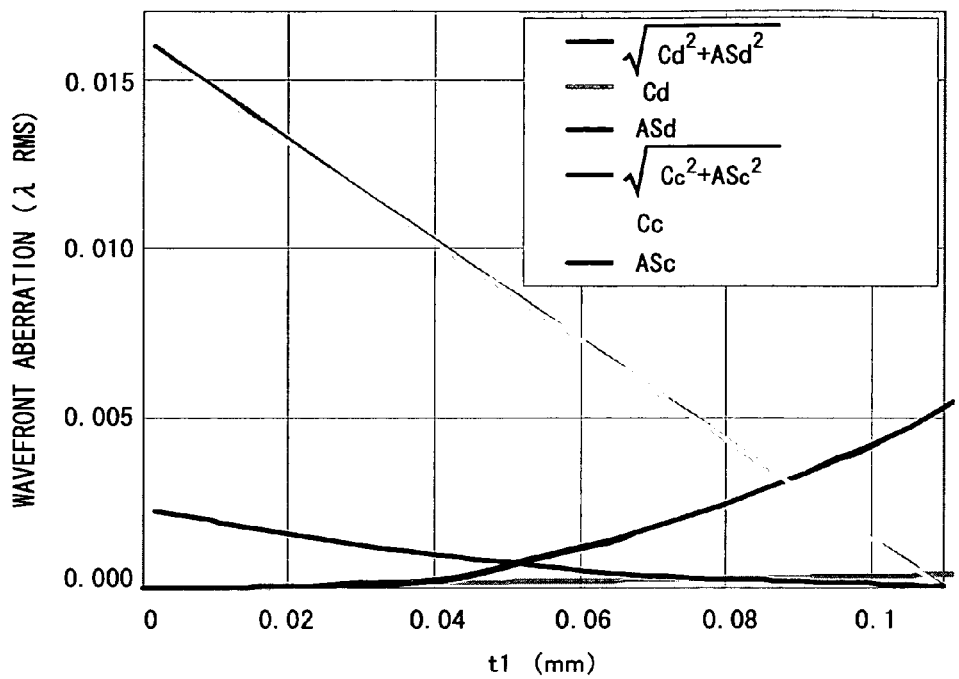
FIG. 6 is a graph showing the characteristics of t1 relative to wavefront aberration for DVD and CD of the objective lens according to the first embodiment of the present invention.

FIG. 6 is a graphic representation of the relationship between t1 and wavefront aberration for DVD and CD in the design results shown in FIG. 3. Because the angle of view increases as the distance t1 from the optical axis to the light emission point of the DVD laser increases, the wavefront aberration for DVD increases accordingly. On the other hand, as the distance t1 increases, the distance t2 from the optical axis to the light emission point of the CD laser decreases, and the angle of view for CD decreases; accordingly, the wavefront aberration for CD decreases. In the graph of FIG. 6, the value of t1 (approx. 0.088) at the intersection point of the graph line indicating wavefront aberration for DVD and the graph line indicating wavefront aberration for CD is an optimum value for equalizing the wavefront aberration for both DVD and CD in design. However, because the design aberration for DVD should be smaller than that for CD as described above, the value of t1 should be smaller than the value at the intersection (approx. 0.088). Thus, a ratio t1/(t1+t2) of the distance t1 from the optical axis to the DVD laser and a distance (t1+t2) between the DVD laser and the CD laser should smaller than 0.80.

In this embodiment, t1=0.075 and t2=0.035, for example. In this condition, wavefront aberration for DVD and CD are appropriately balanced out, thus achieving suitable recording/playback performance for both types of optical disks.

Figure 7:
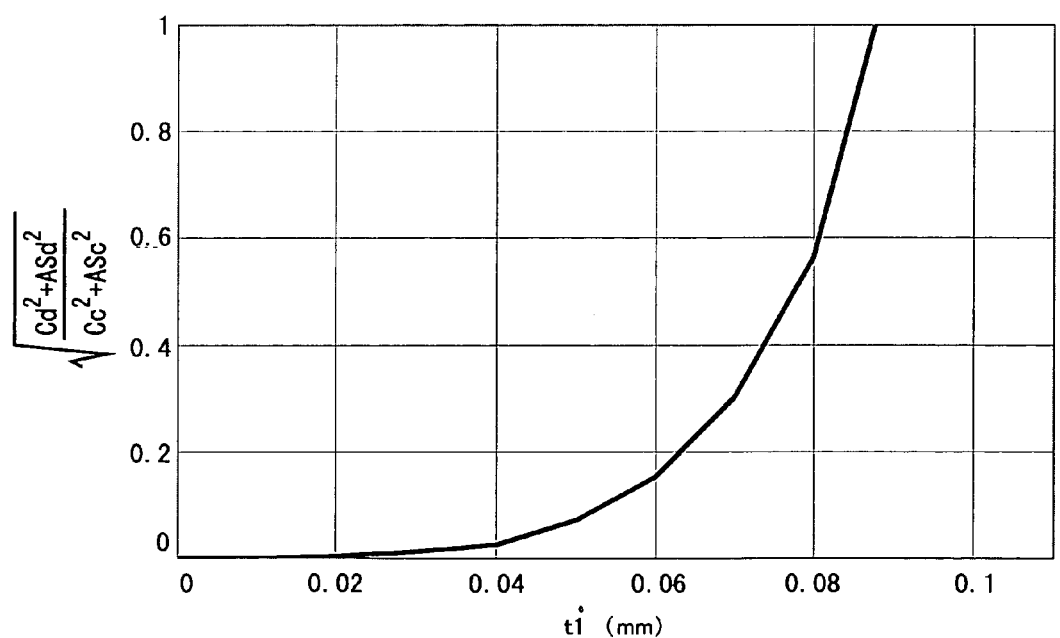
FIG. 7 is a graph showing the characteristics of t1 relative to a ratio of wavefront aberration for DVD and CD of the objective lens according to the first embodiment of the present invention.

FIG. 7 is a graphic representation of the relationship between t1 and the ratio of wavefront aberration for DVD and CD in the deign results shown in FIG. 3. As shown in the graph of FIG. 7, the ratio increases as the value of t1 increases, and the ratio reaches 1 when t1 is approximately 0.088. The ratio of 1 means the wavefront aberration for DVD and CD being equal, which corresponds to the intersection in the graph of FIG. 6.

Figure 8:
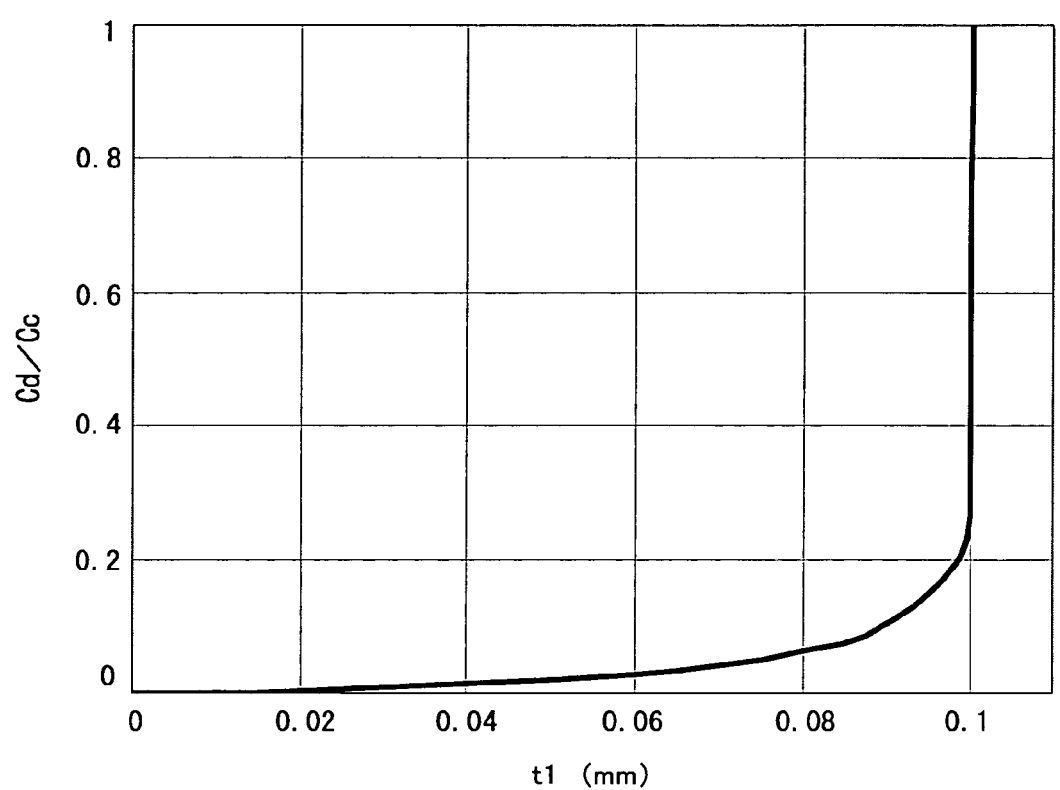
FIG. 8 is a graph showing the characteristics of t1 relative to a ratio of coma aberration for DVD and CD of the objective lens according to the first embodiment of the present invention.

FIG. 8 is a graphic representation of the relationship between t1 and the ratio of coma aberration for DVD and CD in the design results shown in FIG. 3. As shown in the graph of FIG. 8, the ratio increases as the value of t1 increases, and the ratio increases drastically when t1 is approximately 0.1.

Second Embodiment

The optical system of an optical pickup apparatus according to a second embodiment of the present invention is the same as that according to the first embodiment except for the position of the lasers.

The surface shape of a light incident surface A of the objective lens according to this embodiment is described hereinafter with reference to FIG. 2. A distance between points a and b in the j-th zone from an optical axis OA of the light incident surface A in a beam height h direction (radius direction) is expressed by the following function $Z_{Aj}$:

$$Z_{Aj} = B + \frac{Ch^2}{1+\sqrt{1-(K+1)C^2 \cdot h^2}} + A_4 h^4 + A_6 h^6 + A_8 h^8 + A_{10} h^{10} + A_{12} h^{12} + A_{14} h^{14} + A_{16} h^{16}$$

The beam height h in this function is the one measured in the j-th zone.

FIG. 9 shows the range of h and the constants B, C, K, $A_4$, $A_6$, $A_8$, $A_{10}$, $A_{12}$, $A_{14}$, and $A_{16}$ for enabling appropriate reduction of aberration into an acceptable range both for DVD and CD in each zone in the above function.

The surface shape $Z_B$ of a light exit surface B in the second embodiment can be expressed as follows:

$$Z_B = \frac{Ch^2}{1+\sqrt{1-(K+1)C^2 \cdot h^2}} + A_4 h^4 + A_6 h^6 + A_8 h^8 + A_{10} h^{10}$$

where $C=-0.06903378$, $K=15.276111$, $A_4=0.01217283$, $A_6=-0.0031354542$, $A_8=0.0005626051$, $A_{10}=-0.000052581419$.

A distance between surface vertexes f and e on the optical axis of the objective lens 100, which is a center thickness to, is 2.2 mm. A refractive index n at a wavelength $\lambda_1=655$ nm (DVD) is 1.604194, and a refractive index n at a wavelength $\lambda_2=790$ nm (CD) is 1.599906.

The numerical aperture NA for a wavelength of the DVD laser 1 is 0.60, and a focal length ft for the DVD disk 6 is 3.36 mm. The numerical aperture NA for a wavelength of the CD laser 2 is 0.47, and a focal length ft for the CD disk 7 is 3.38 mm.

Figure 10:
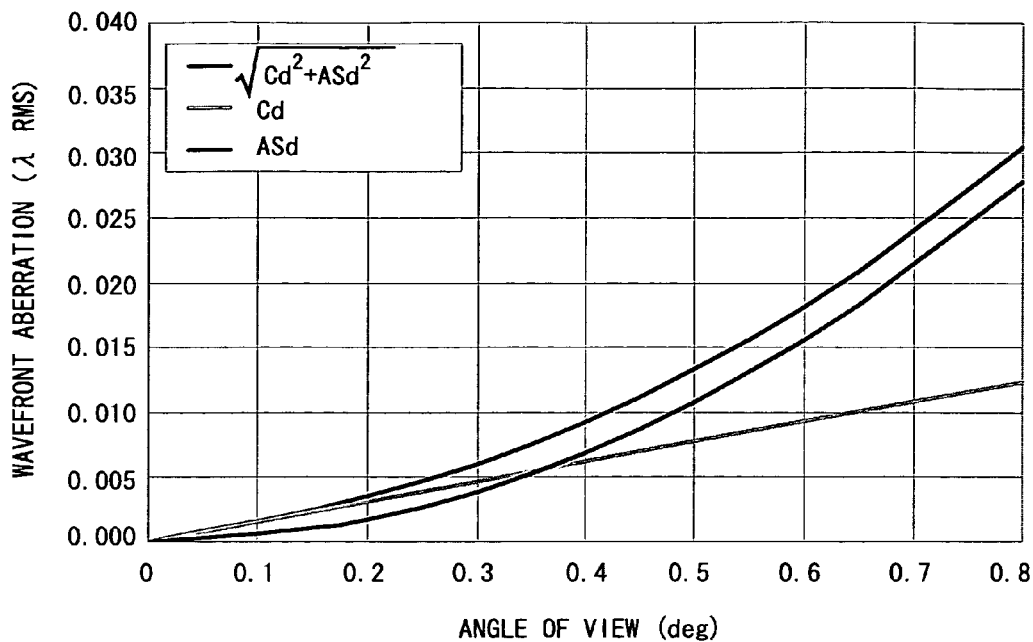
FIG. 10 is a graph showing the characteristics of an angle of view for a DVD wavelength of an objective lens according to the second embodiment of the present invention.
Figure 11:
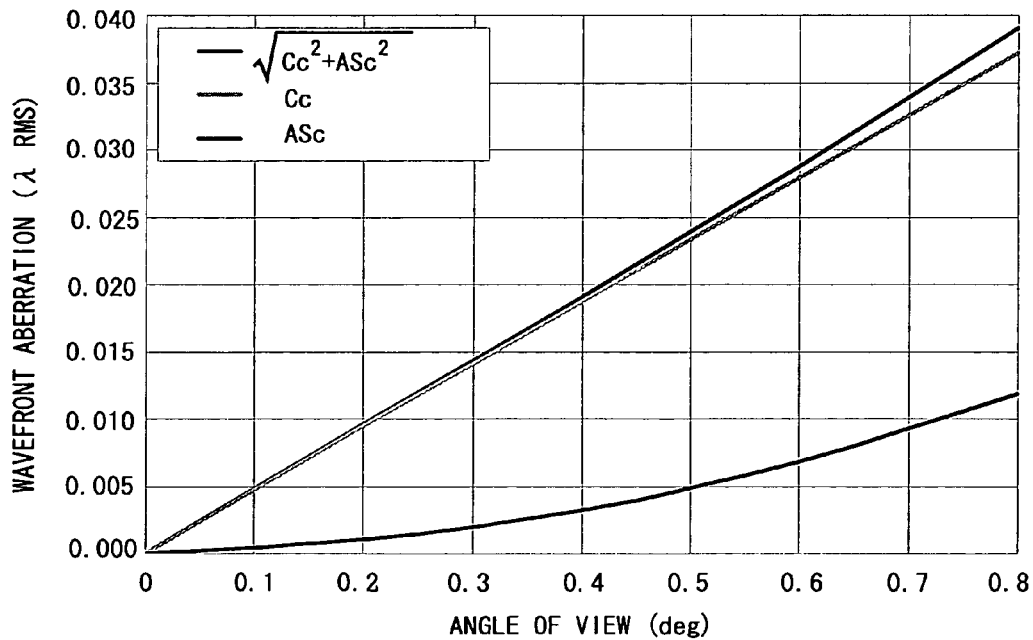
FIG. 11 is a graph showing the characteristics of an angle of view for a CD wavelength of an objective lens according to the second embodiment of the present invention.

FIGS. 10 and 11 show the characteristics of an angle of view with respect to wavefront aberration for DVD and CD, respectively, in the design results shown in FIG. 9. As shown in FIGS. 10 and 11, wavefront aberration increases as the angle of view increases in both DVD and CD.

Figure 12:
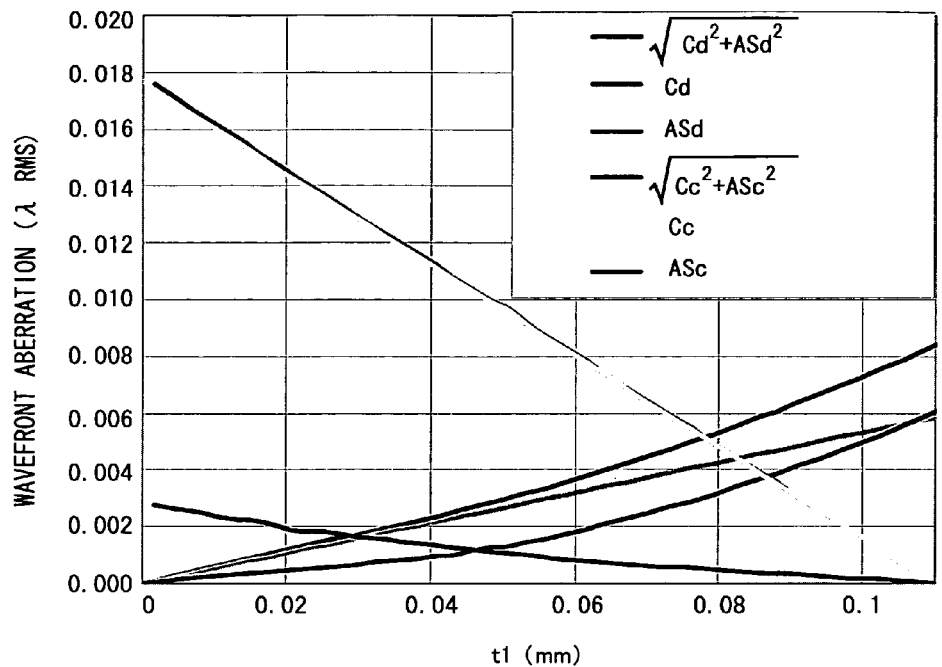
FIG. 12 is a graph showing the characteristics of t1 relative to wavefront aberration for DVD and CD of the objective lens according to the second embodiment of the present invention.

FIG. 12 is a graphic representation of the relationship between t1 and wavefront aberration for DVD and CD in the design results shown in FIG. 9. Because the angle of view increases as the distance t1 from the optical axis to the light emission point of the DVD laser increases, the wavefront aberration for DVD increases accordingly. On the other hand, as the distance t1 increases, the distance t2 from the optical axis to the light emission point of the CD laser decreases, and the angle of view for CD decreases; accordingly, the wavefront aberration for CD decreases. In the graph of FIG. 12, the value of t1 (approx. 0.078) at the intersection point of the graph line indicating wavefront aberration for DVD and the graph line indicating wavefront aberration for CD is an optimum value for equalizing the wavefront aberration for both DVD and CD in design. However, because the design aberration for DVD should be smaller than that for CD as described above, the value of t1 should be smaller than the value at the intersection (approx. 0.078).

In this embodiment, t1=0.065 and t2=0.045, for example. In this condition, wavefront aberration for DVD and CD are appropriately balanced out, thus achieving suitable recording/playback performance for both types of optical disks.

Figure 13:
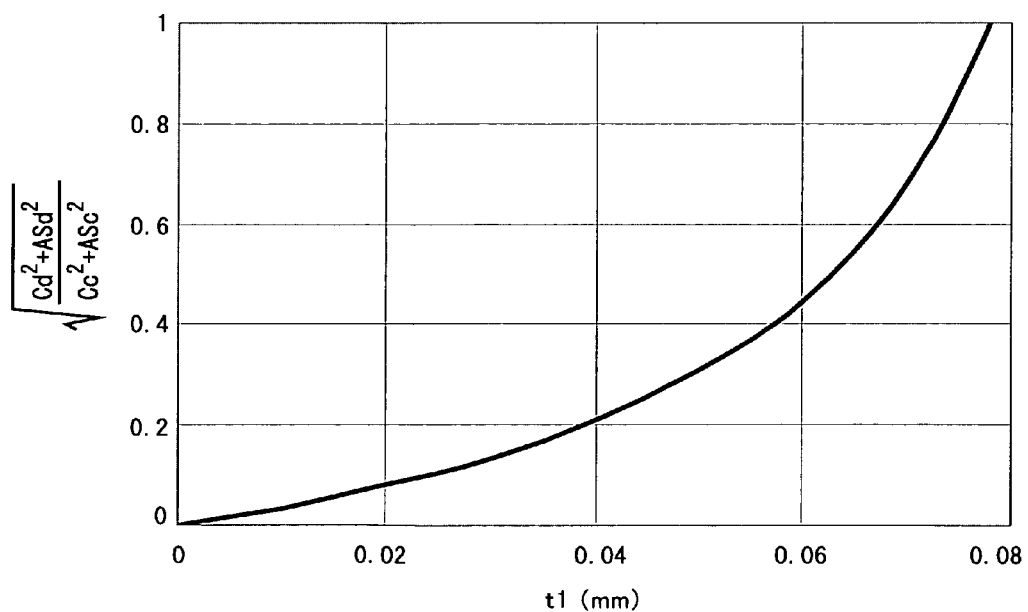
FIG. 13 is a graph showing the characteristics of t1 relative to a ratio of wavefront aberration for DVD and CD of the objective lens according to the second embodiment of the present invention.

FIG. 13 is a graphic representation of the relationship between t1 and the ratio of wavefront aberration for DVD and CD in the deign results shown in FIG. 9. As shown in the graph of FIG. 13, the ratio increases as the value of t1 increases, and the ratio reaches 1 when t1 is approximately 0.078. The ratio of 1 means the wavefront aberration for DVD and CD being equal, which corresponds to the intersection in the graph of FIG. 12.

Figure 14:
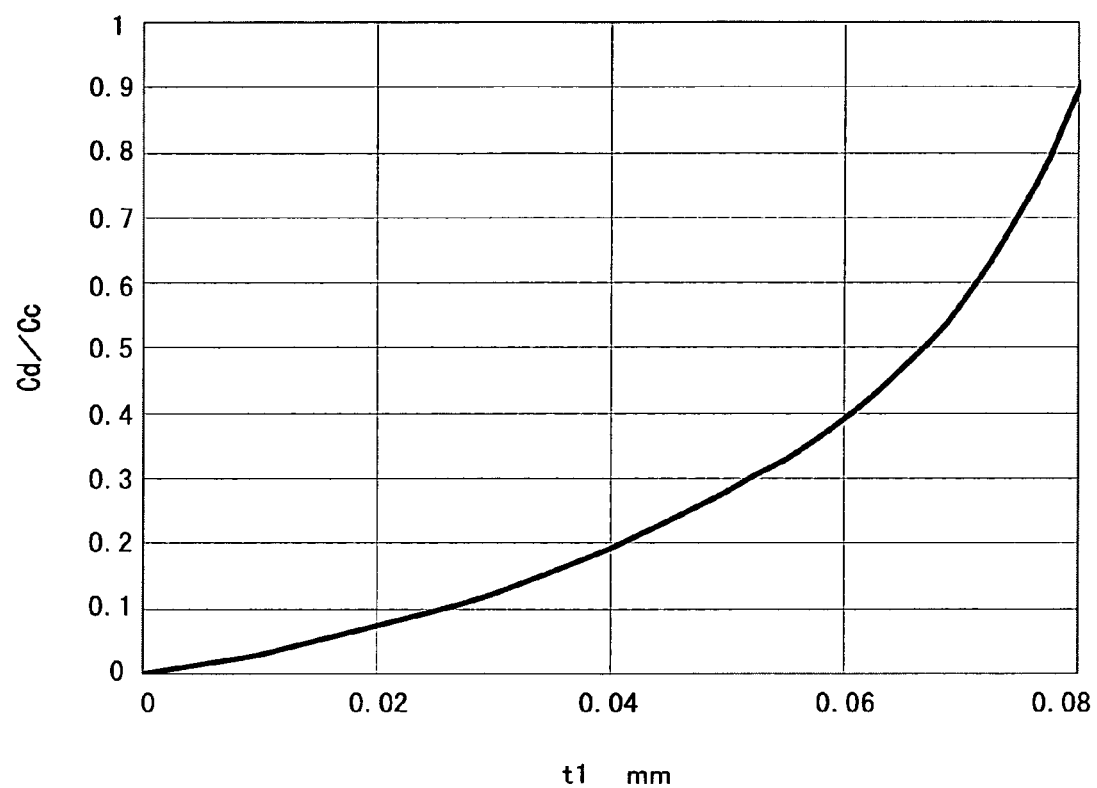
FIG. 14 is a graph showing the characteristics of t1 relative to a ratio of coma aberration for DVD and CD of the objective lens according to the second embodiment of the present invention.

FIG. 14 is a graphic representation of the relationship between t1 and the ratio of coma aberration for DVD and CD in the deign results shown in FIG. 9. As shown in the graph of FIG. 14, the ratio increases as the value of t1 increases.

Other Embodiments

Although the above-described embodiments employ DVD and CD by way of illustration, the present invention may be applied to the case of using Blu-ray disk which uses a laser beam having a wavelength of about 405 nm, and CD.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An objective lens for use in an optical head having a fixed distance between a first laser emitting a laser beam with a wavelength $\lambda 1$ and a second laser emitting a laser beam with a wavelength $\lambda 2$ being longer than the wavelength $\lambda 1$, the objective lens focusing the laser beam emitted from the first laser on a first optical disk by a first numerical aperture and focusing the laser beam emitted from the second laser on a second optical disk by a second numerical aperture being smaller than the first numerical aperture, wherein wavefront aberration in design for the second optical disk is greater than wavefront aberration in design for the first optical disk, and a ratio t1/(t1+t2) of a distance t1 from an optical axis to the first laser and a distance (t1+t2) between the first laser and the second laser is smaller than 0.80.

2. An optical head that uses the objective lens of claim 1.

3. An optical system that uses the optical head of claim 2.

4. An objective lens for use in an optical head having a fixed distance between a first laser emitting a laser beam with a wavelength $\lambda 1$ and a second laser emitting a laser beam with a wavelength $\lambda 2$ being longer than the wavelength $\lambda 1$, the objective lens focusing the laser beam emitted from the first laser on a first optical disk by a first numerical aperture and focusing the laser beam emitted from the second laser on a second optical disk by a second numerical aperture being smaller than the first numerical aperture, wherein composite aberration $(C2^2+AS2^2)^{1/2}$ of coma aberration C2 and astigmatism AS2 of the second optical disk in design is greater than composite aberration $(C1^2+AS1^2)^{1/2}$ of coma aberration C1 and astigmatism AS1 of the first optical disk in design.

5. The objective lens according to claim 4, wherein $0.25<(C1^2+AS1^2)^{1/2}/(C2^2+As2^2)^{1/2}<0.80$ is satisfied.

6. The objective lens according to claim 4, wherein $0.12<(C1/C2)<0.70$ is satisfied.

7. A design method for an objective lens for use in an optical head having a fixed distance between a first laser emitting a laser beam with a wavelength $\lambda 1$ and a second laser emitting a laser beam with a wavelength $\lambda 2$ being longer than the wavelength $\lambda 1$, the objective lens focusing the laser beam emitted from the first laser on a first optical disk by a first numerical aperture and focusing the laser beam emitted from the second laser on a second optical disk by a second numerical aperture being smaller than the first numerical aperture, wherein wavefront aberration in design for the second optical disk is greater than wavefront aberration in design for the first optical disk, and if coma aberration and astigmatism of the first optical disk in design are C1 and AS1, respectively, and coma aberration and astigmatism of the second optical disk in design are C2 and AS2, respectively, values of C1, AS1, C2, and AS2 are determined so as to satisfy: $0.25<(C1^2+AS1^2)^{1/2}(C2^2+AS2^2)^{1/2}<0.80$.

8. A design method for an objective lens for use in an optical head having a fixed distance between a first laser emitting a laser beam with a wavelength $\lambda 1$ and a second laser emitting a laser beam with a wavelength $\lambda 2$ being longer than the wavelength $\lambda 1$, the objective lens focusing the laser beam emitted from the first laser on a first optical disk by a first numerical aperture and focusing the laser beam emitted from the second laser on a second optical disk by a second numerical aperture being smaller than the first numerical aperture, wherein wavefront aberration in design for the second optical disk is greater than wavefront aberration in design for the first optical disk, and a ratio t1/(t1+t2) of a distance t1 from an optical axis to the first laser and a distance (t1+t2) between the first laser and the second laser is smaller than 0.80.

9. An objective lens for use in an optical head having a fixed distance between a first laser emitting a laser beam with a wavelength $\lambda 1$ and a second laser emitting a laser beam with a wavelength $\lambda 2$ being longer than the wavelength $\lambda 1$, the objective lens focusing the laser beam emitted from the first laser on a first optical disk by a first numerical aperture and focusing the laser beam emitted from the second laser on a second optical disk by a second numerical aperture, wherein composite aberration $(C1^2+AS1^2)^{1/2}$ of coma aberration C1 and astigmatism AS1 of the first optical disk and composite aberration $(C2^2+AS2^2)^2$ of coma aberration C2 and astigmatism AS2 of the second optical disk satisfy:

$$0.25<(C1^2+AS1^2)^{1/2}/(C2^2+AS2^2)^{1/2}<0.80.$$

* * * * *